(12) United States Patent
Sujan et al.

(10) Patent No.: US 8,509,974 B2
(45) Date of Patent: Aug. 13, 2013

(54) HYBRID POWER TRAIN RATE CONTROL

(75) Inventors: Vivek Anand Sujan, Columbus, IN (US); Martin T. Books, Columbus, IN (US); Patrick O. Djan-Sampson, Columbus, IN (US); Praveen Muralidhar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 295 days.

(21) Appl. No.: 12/861,242

(22) Filed: Aug. 23, 2010

(65) Prior Publication Data

US 2012/0046812 A1    Feb. 23, 2012

(51) Int. Cl.
G06F 19/00 (2006.01)

(52) U.S. Cl.
USPC ............... 701/22; 701/51; 340/438; 340/441; 340/455

(58) Field of Classification Search
USPC ................. 701/22, 51; 340/438, 441, 455
See application file for complete search history.

(56) References Cited

U.S. PATENT DOCUMENTS

| | | | |
|---|---|---|---|
| 3,732,751 A | 5/1973 | Berman et al. | |
| 5,842,534 A | 12/1998 | Frank | |
| 5,923,093 A | 7/1999 | Tabata et al. | |
| 6,081,042 A | 6/2000 | Tabata et al. | |
| 6,173,574 B1 | 1/2001 | Obayashi et al. | |
| 6,203,468 B1 | 3/2001 | Nitta et al. | |
| 6,518,732 B2 | 2/2003 | Palanisamy | |
| 6,568,173 B1 | 5/2003 | Kolmanovsky et al. | |
| 6,629,026 B1 | 9/2003 | Baraszu et al. | |
| 6,912,848 B2 | 7/2005 | Bedapudi | |
| 7,040,434 B2 | 5/2006 | Komiyama et al. | |
| 7,100,362 B2 | 9/2006 | McGee et al. | |
| 7,200,476 B2 | 4/2007 | Cawthorne et al. | |
| 7,487,030 B2 | 2/2009 | Heap et al. | |
| 7,520,351 B2 | 4/2009 | Uchisasai et al. | |
| 7,559,388 B2 | 7/2009 | Severinsky et al. | |
| 7,577,507 B2 | 8/2009 | Morris | |
| 7,621,120 B2 | 11/2009 | Matheaus et al. | |
| 2003/0229429 A1 | 12/2003 | Zhang et al. | |
| 2006/0021809 A1 | 2/2006 | Xu et al. | |
| 2009/0118947 A1* | 5/2009 | Heap et al. | 701/55 |

OTHER PUBLICATIONS

International Search Report and Written Opinion, PCT/US2011/047580, ISR/US, Cummins Inc., Jan. 4, 2012.

* cited by examiner

*Primary Examiner* — Mary Cheung
*Assistant Examiner* — Brian P Sweeney
(74) *Attorney, Agent, or Firm* — Krieg DeVault LLP

(57) ABSTRACT

A system includes a hybrid power train having a combustion torque device, an electrical torque device, a driveline mechanically coupled to the torque devices, a battery that exchanges energy with the driveline, and a torque input device that provides a torque request. The hybrid power train is at least partially parallel. The system includes a controller having modules to execute operations for rate control of the hybrid power train. A battery protection module determines a battery protection charge rate limit, a power train protection module determines a power train protection torque change limit, and a torque request module determines the torque request. A rate control module provides a torque balance parameter in response to the limits and the torque request. A torque control module provides an electrical torque and a combustion torque to the driveline in response to the torque balance parameter.

20 Claims, 2 Drawing Sheets

HYBRID POWER TRAIN RATE CONTROL

BACKGROUND

The technical field generally relates to power systems having multiple power input sources, in particular including a power source that is electrically driven and has an electric power storage device. Systems having multiple power sources experience different power train stress profiles than systems having a single power source. Additionally, managing the stress profile for a power train with multiple power sources is more complex depending upon the application and duty cycle of the device having the power train. Further, electrical power storage devices are subject to excessive wear and degradation in certain applications. Therefore, further technological developments are desirable in this area.

SUMMARY

One embodiment is a unique system for rate control of a hybrid power train system by controlling a torque contribution from in internal combustion torque provider and a torque contribution from an electrical torque provider. Other embodiments include unique methods, systems, and apparatus for rate control of a hybrid power train system. Further embodiments, forms, objects, features, advantages, aspects, and benefits shall become apparent from the following description and drawings.

DESCRIPTION OF THE ILLUSTRATIVE EMBODIMENTS

Figure 1:
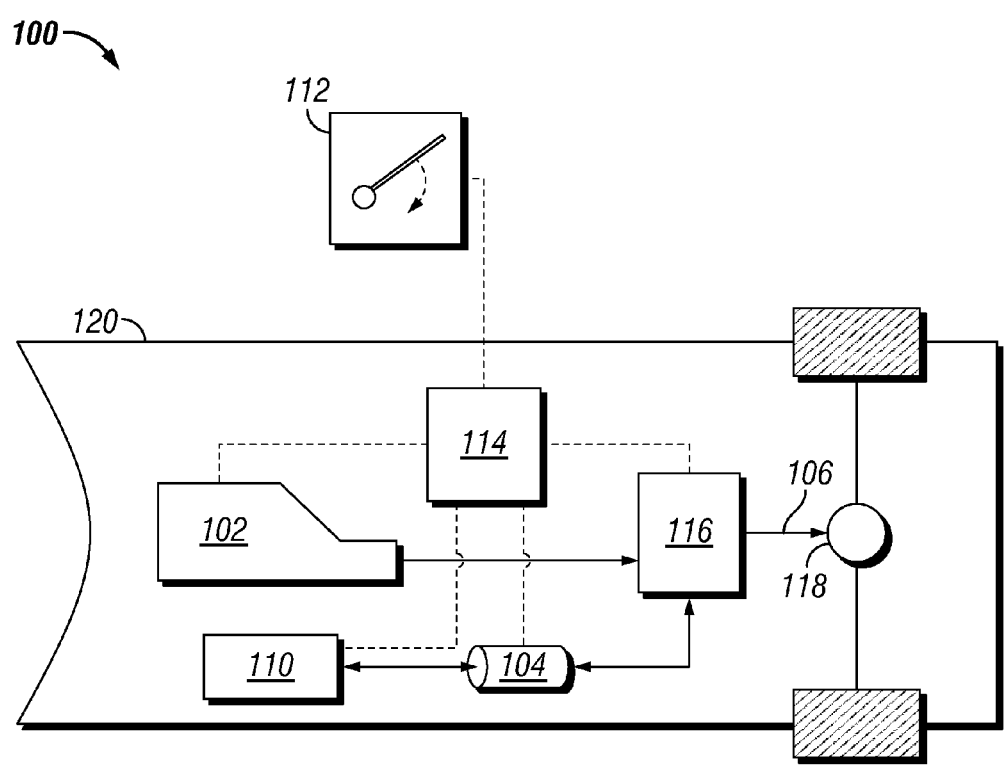
FIG. 1 is a schematic diagram of a system for rate control of a hybrid power train.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 for rate control of a hybrid power train is illustrated. The system includes a hybrid power train having a combustion torque device 102 and an electrical torque device 104. The hybrid power train illustrated in FIG. 1 is a parallel arrangement, where the combustion torque device 102, the electrical torque device 104, or both may apply torque to a driveline 106 to propel a vehicle 120 or otherwise meet a load demand. However, the hybrid power train may be any arrangement understood in the art that is at least partially parallel, including without limitation parallel or series-parallel.

The driveline 106 is mechanically coupled to the combustion torque device 102 and the electrical torque device 104. In the arrangement illustrated in FIG. 1, a power splitter 116 receives power input from the combustion torque device 102 or the electrical torque device 104, and can further provide power to the devices 102, 104, for example to charge a battery 110 and/or to re-start the engine 102 during operations. The battery 110 exchanges energy with the driveline 106. A component 118 of the power train is shown. The exemplary component 118 in FIG. 1 is an axle gear, but other components may be present, including without limitation a transmission (which may be included within the power splitter 116), a torque converter, a gear splitter, a differential, a deep reduction gear, and/or any other device known in the art that is in the torque path between either of the torque devices 102, 104 and a final load.

The system 100 further includes a torque input device 112 that provides a torque request. The torque input device 112 may be one or more of any type of torque input device understood in the art. Non-limiting examples of torque input devices 112 include an accelerator pedal providing an electronic or mechanical position indication, a switch arranged to provide a torque input request either as indicated by a switch position or calculated from the switch position over time (e.g. ramped up or down with the switch position), a continuous device to provide a torque input request (e.g. a dial, potentiometer, meter, etc.), and/or a device that provides a feedback representing the torque request (e.g. a device that automatically responds to an engine or vehicle speed to provide a torque request consistent with reducing an offset in the speed from a set point). The system 100 may include multiple torque input devices 112 that may provide torque requests sequentially, selectively, or in parallel.

The system 100 further includes a controller 114 structured to perform certain operations to perform rate control in a hybrid power train. In certain embodiments, the controller 114 forms a portion of a processing subsystem that includes one or more computing devices each having memory, processing, and/or communication hardware. The controller 114 may be a single device or a distributed device, and the functions of the controller 114 may be performed by hardware and/or software.

The controller 114 includes one or more modules structured to functionally execute the operations of the controller 114. The controller 114 includes a battery protection module, a power train protection module, a torque request module, a rate control module, and a torque control module. The battery protection module determines a battery protection charge rate limit, the power train protection module determines a power train protection torque change limit, and the torque request module determines the torque request from the torque input device 112. The rate control module provides a torque balance parameter in response to the limits and the torque request, and the torque control module provides an electrical torque and a combustion engine torque in response to the torque balance parameter. In certain embodiments, the controller 114 further includes a priority determination module, which determines a responsiveness priority value (RPV), and the rate control module further determines the torque balance parameter in response to the RPV.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Figure 2:
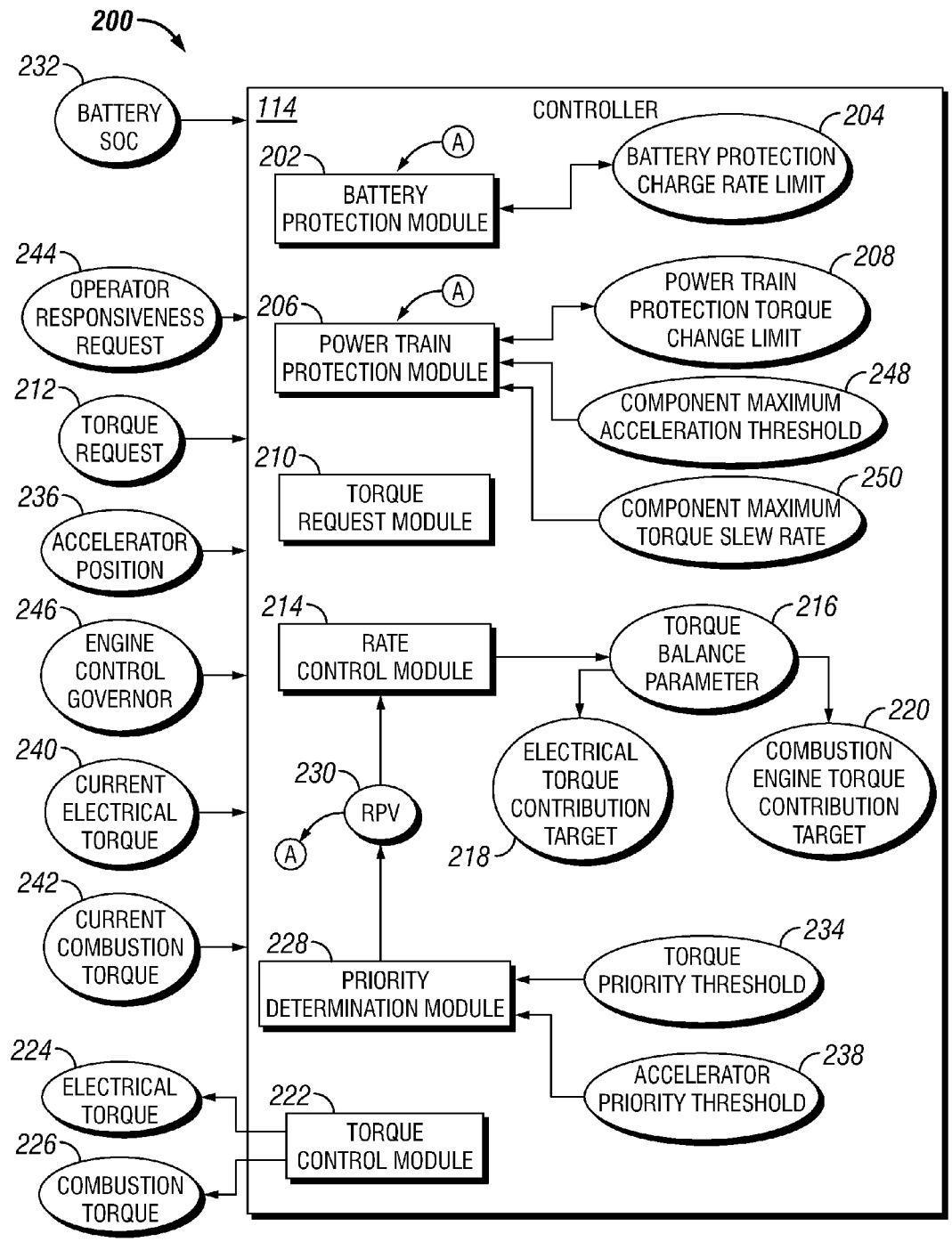
FIG. 2 is a schematic block diagram of an apparatus for rate control of a hybrid power train.

FIG. 2 is a schematic illustration of a processing subsystem 200 including a controller 114 for rate control of a hybrid power train. In the description of FIG. 2, a module determines a value by any method understood in the art, including, without limitation, reading the value from a memory location, receiving the value over a datalink, receiving the value as a physical value (e.g. a voltage reading from a sensor), and/or calculating the value from one or more other parameters.

The controller 114 includes a battery protection module 202 that determines a battery protection charge rate limit 204. The battery protection charge rate limit 204 is the amount of charge flux allowable for the battery 110 under the present operating conditions. The battery protection charge rate limit 204 may depend upon the current battery state-of-charge (battery SOC) 232, the current operating temperature of the battery 110, the age of the battery 110, or other considerations understood in the art. In certain embodiments, the battery protection charge rate limit 204 is a binary description, e.g. charging is ALLOWED or NOT ALLOWED, but the battery protection charge rate limit 204 may be a current value or other description of a battery charge rate. In certain embodiments, the battery protection charge rate limit 204 is a description of the discharge rate presently allowed at the battery 110.

The controller 114 includes a power train protection module 206 that determines a power train protection torque change limit 208. An exemplary power train protection module 206 determines a maximum acceleration threshold 248 for a component 118 of the power train. For example, a gear or other component 118 includes a specified maximum acceleration threshold 248, which may be dependent upon the current amount of torque being experienced at the component 118, the age of the component 118, the temperature of the component 118, the current rotating speed of the component 118, or other factors known in the art, and the power train protection module 206 determines a power train protection torque change limit 208 consistent with the maximum acceleration threshold 248.

In another example, the gear or other component 118 includes a specified maximum torque slew rate 250, which may be dependent upon the current amount of torque being experienced at the component 118, the age of the component 118, the temperature of the component 118, the current rotating speed of the component 118, or other factors known in the art, and the power train protection module 206 determines a power train protection torque change limit 208 consistent with the maximum torque slew rate 250. The maximum torque slew rate 250 is a description of a rate of change of torque versus another parameter, typically time, and may be calculated or updated during the operations of the controller 114. The powertrain protection torque change limit 208 may be a value determined in any units known in the art, including at least: rate of change in torque (δT) per unit time, δT per revolution of the driveline 106, δT per revolution of the engine 104, and/or a qualitative description of δT usable by the controller 114 to determine the allowable δT based on a look-up table or algorithm (e.g. LOW, MEDIUM, or HIGH, each mapped to a range of δT values in a look-up table not shown).

The controller 114 includes a torque request module 210 that determines a torque request 212. The torque request 212 may be determined directly or in response to an input value. For example, the torque request 212 may be an engine speed request that is converted to an intermediate torque value that achieves the requested engine speed or that progresses acceptably toward the requested engine speed, where the intermediate torque value is interpreted as the torque request 212. In another example, the torque request 212 is a direct torque request—for example provided by an operator input that requests a certain torque value. In yet another example, the torque request 212 is a value determined from an input that is related to a torque value—for example an accelerator position 236 converted into a torque request 212.

The controller 114 further includes a rate control module 214 that provides a torque balance parameter 216 in response to the battery protection charge rate limit 204, the power train protection torque change limit 208, and the torque request 212. The torque balance parameter 216 includes an electrical torque contribution target 218 and a combustion engine torque contribution target 220. For example, the torque request 212 may indicate that 600 ft-lbs. of torque are requested, and the torque balance parameter 216 may indicate that the electrical torque contribution target 218 is 200 ft-lbs. and the combustion engine torque contribution target 220 is 400 ft-lbs. The torque balance parameter 216 may be a specified contribution for each torque contributing portion of the hybrid power train, a ratio of the torque contributions (e.g. 2:1 combustion:electrical), a fraction to be provided by a specified torque contributor of the hybrid power train (e.g. 66% combustion), and/or a limit value to be provided by specified torque contributors of the hybrid power train (e.g. 400 maximum combustion, 350 maximum electrical).

The rate control module 214 may operate independently of or in conjunction with other torque determination mechanisms in the system 100. For example, the nominal control algorithms of the system 100 may determine a torque contribution from each of the torque contributors in the hybrid power train for independent purposes, e.g. to maximize fuel economy. The rate control module 214 may then provide the torque balance parameter 216 with the electrical torque contribution target 218 and the combustion engine torque contribution target 220 applied as downstream limits on the torque contributions from the nominal control algorithms. For example, where the nominal control algorithms indicate that 475 ft-lbs. of torque are to be provided from the engine 102, and 225 ft-lbs. of torque are to be provided from the motor-generator 104, and the rate control module 214 limits the engine output torque to 400 ft-lbs. the nominal control algorithm may adjust the engine torque to 400 ft-lbs. and the motor-generator torque to 300 ft-lbs. to achieve the same output torque of the hybrid power train.

In certain embodiments, the torque contribution targets 218, 220 are utilized as the primary torque control, without a nominal control algorithm operating. Where the torque contribution targets 218, 220 are utilized as the primary torque control, the rate control module 214 determines the torque balance parameter 216 according to default considerations, adjusting when the battery protection charge rate limit 204 and/or the power train protection torque change limit 208 require a torque balance parameter 216 that is different from the nominal torque balance parameter 216.

Generally, the battery protection charge rate limit 204 is more likely to require an increase in the electrical torque contribution target 218 at high battery SOC 232, at low vehicle speeds, when a transmission (not shown) is in a low gear, and at low battery SOC 232 when the torque request 212 is a negative torque value. Further, generally, the power train protection torque change limit 208 is more likely to require an increase in the combustion engine torque contribution target 220 at high vehicle speeds and in high transmission gears, at low battery SOC 232 values, at very high total torque request values 212, at negative torque request 212 values where the battery SOC 232 is high and where an engine compression brake is available, and at very large negative torque request 212 values where an engine compression brake is available. The described behaviors are exemplary and non-limiting.

The controller 114 further includes a torque control module 222 that provides an electrical torque 224 and a combustion torque 226 to a power train in response to the torque balance parameter 216. The electrical torque 224 and combustion torque 226 may be electronic commands that are implemented to command the torque contributing devices 102, 104. Further, the electrical torque 224 and combustion torque 226 are determined from the torque balance parameter 216, but may be filtered, limited, or otherwise adjusted as understood in the art before being provided.

The exemplary controller 114 further includes a priority determination module 228 that determines a responsiveness priority value (RPV) 230. The RPV 230 may be determined in response to a priority parameter. An exemplary priority parameter includes a difference between the torque request 212 and a torque priority threshold 234. Thus, in one example, the priority determination module 228 provides an RPV 230 that allows a high priority response of the rate control module 214 when the torque request 212 is high.

Another exemplary priority parameter is a difference between a current accelerator position 236 and an accelerator priority threshold 238. Thus, in one example, the priority determination module 228 provides an RPV 230 that allows a high priority response of the rate control module 214 when the accelerator position 236 indicates the operator is requesting a high performance output.

Yet another exemplary priority parameter is a current engine control governor value, for example "CRUISE", "PTO", or other indication of the current engine governor. Thus, in one example, the priority determination module 228 provides an RPV 230 that allows a high priority response or a low priority response depending upon the desired priority according to the current engine control governor 246. Certain vehicles 120 and systems 100 provide higher (or lower) priority operations to meet torque demands in certain engine control governor modes to enhance fuel economy, to direct operator behavior (e.g. to encourage usage of the CRUISE control), and/or to meet application demands (e.g. providing more responsive torque output for a PTO governor mode).

Another exemplary priority parameter is a difference between the torque request 212 and a sum of the current electrical torque 240 and current combustion torque 242. The current electrical torque 240 and the current combustion torque 242 are the torque amounts presently provided by the engine 102 and the motor/generator 104, which are generated in response to the electrical torque 224 and the combustion torque 226 commands from the torque control module 222, but which may not match the commands 224, 226 during transient events or due to lags or limitations in the system 100 that are applied after the commands 224, 226 are provided. Thus, in one example, the priority determination module 228 provides a higher or lower priority RPV 230 depending on whether the current torque request 212 is being met or missed, and the amount of the missed torque if applicable.

Another exemplary priority parameter is an operator responsiveness request 244. For example, the vehicle 120 may be provided with an input device designated to accept an operator responsiveness request 244 and to provide the request 244 to the priority determination module 228. Non-limiting examples of an operator responsiveness request 244 application include an emergency vehicle that provides the operator responsiveness request 244 to the controller 114 when the sirens of the vehicle are activated. Another example includes an operator responsiveness request 244 that is a "high fuel economy" mode, wherein the operator is indicating that lower responsiveness is acceptable to improve fuel economy of the system 100. The exemplary operator responsiveness requests 244 are non-limiting, and any operator responsiveness request 244, including a switch, button, or other input, and further including any request 244 derived from operator behavior (e.g. highly transient operation indicating an operator desire for responsive performance) are contemplated herein as operator responsiveness requests 244. Thus, in one example, the priority determination module 228 provides a higher or lower priority RPV 230 depending upon whether an operator responsiveness request 244 is active.

In certain embodiments, the rate control module 214 further determines the torque balance parameter 216 in response to the RPV 230. For example, the rate control module 214 may provide a torque balance parameter 216 having an electrical torque contribution target 218 and a combustion engine torque contribution target 220 that provide a total torque amount that is lower than the torque request 212 during a transient event, and that is reduced in the presence of a low priority RPV 230 relative to a higher priority RPV 230. Alternatively or additionally, the torque balance parameter 216 may provide a higher proportion of torque from one of the electrical or combustion sides of the hybrid power train in the presence of a low priority RPV 230 relative to a higher priority RPV 230.

In certain embodiments, the battery protection module 202 further determines the battery protection charge rate limit 204 in response to the RPV 230. For example, the battery protection module 202 may allow the battery 110 to discharge to a deeper discharge level, or to charge to a higher maximum charge level, in response to the presence of a high priority RPV 230. The battery protection module 202 may further determine the battery protection charge rate limit 204 in response to the RPV 230 and the current battery SOC 232.

In certain embodiments, the power train protection module 206 further determines the power train protection torque change limit 208 in response to the RPV 230. For example, the power train protection module 206 may allow a greater component maximum acceleration threshold 248 or a higher component maximum torque slew rate 250 in the presence of a high priority RPV 230.

The operational descriptions which follow provide illustrative embodiments of performing procedures for rate control of a hybrid power train. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes an operation to determine a battery protection charge rate limit, an operation to determine a power train protection torque change limit, and an operation to determine a torque request. The procedure further includes an operation to provide a torque balance parameter in response to the battery protection charge rate limit, the power train protection torque change limit, and the torque request. The torque balance parameter includes an electrical torque contribution target and a combustion engine torque contribution target. The procedure further includes an operation to provide an electrical torque and a combustion engine torque to a power train in response to the torque balance parameter.

An additional procedure includes an operation to determine a responsiveness priority value (RPV) and an operation to provide the torque balance parameter further in response to the RPV. The exemplary procedure further includes an operation to determine the battery protection charge rate limit and/or the power train protection torque change limit in response to the RPV. An exemplary operation to determine the RPV includes determining the RPV in response to a current torque request, and/or in response to a difference between the current torque request and a sum of a current electrical torque and a current combustion engine torque.

An exemplary procedure further includes an operation to determine a maximum torque slew rate for a component of the power train in response to the RPV, and an operation to determine the power train protection torque change limit in response to the maximum torque slew rate for a component of the power train. A further procedure includes an operation to determine a maximum acceleration threshold for a component of the power train in response to the RPV, and an operation to determine the power train protection torque change limit in response to the maximum acceleration threshold for a component of the power train.

Another exemplary procedure includes an operation to determine the power train protection torque change limit in response to a maximum torque slew rate for a component of the power train. Yet another exemplary procedure includes an operation to determine the power train protection torque change limit in response to a maximum acceleration threshold for a component of the power train.

As is evident from the figures and text presented above, a variety of embodiments according to the present invention are contemplated.

An exemplary embodiment is a method including determining a battery protection charge rate limit, determining a power train protection torque change limit, and determining a torque request. The method further includes providing a torque balance parameter in response to the battery protection charge rate limit, the power train protection torque change limit, and the torque request. The torque balance parameter includes an electrical torque contribution target and a combustion engine torque contribution target. The method further includes providing an electrical torque and a combustion engine torque to a power train in response to the torque balance parameter.

Further embodiments include determining a responsiveness priority value (RPV) and providing the torque balance parameter further in response to the RPV. An exemplary method further includes determining the battery protection charge rate limit and/or the power train protection torque change limit in response to the RPV. The RPV may be determined in response to a current torque request, and/or in response to a difference between the current torque request and a sum of a current electrical torque and a current combustion engine torque.

The exemplary method further includes determining a maximum torque slew rate for a component of the power train in response to the RPV, and determining the power train protection torque change limit in response to the maximum torque slew rate for a component of the power train. A further embodiment includes determining a maximum acceleration threshold for a component of the power train in response to the RPV, and determining the power train protection torque change limit in response to the maximum acceleration threshold for a component of the power train.

An exemplary method further includes determining the power train protection torque change limit in response to a maximum torque slew rate for a component of the power train. Yet another exemplary method includes determining the power train protection torque change limit in response to a maximum acceleration threshold for a component of the power train.

Another exemplary embodiment is an apparatus including modules for functionally executing operations for rate control in a hybrid power train. The apparatus includes a battery protection module that determines a battery protection charge rate limit, a power train protection module that determines a power train protection torque change limit, and a torque request module that determines a torque request. The apparatus further includes a rate control module that provides torque balance parameter in response to the battery protection charge rate limit, the power train protection torque change limit, and the torque request. The torque balance parameter includes an electrical torque contribution target and a combustion engine torque contribution target. That apparatus further includes a torque control module that provides an electrical torque and a combustion torque to a power train in response to the torque balance parameter.

An exemplary apparatus further includes a priority determination module that determines a responsiveness priority value (RPV). The rate control module further determines the torque balance parameter in response to the RPV. The battery protection module further determines the battery protection charge rate limit in response to the RPV, and/or the power train protection module further determines the power train protection limit in response to the RPV. A further embodiment includes the battery protection module determining a battery state of charge (SOC), and the battery protection module determining the battery protection charge rate limit in response to the SOC and the RPV.

Another exemplary apparatus further includes the priority determination module determining the RPV in response to a priority parameter. Exemplary priority parameters include: a difference between the torque request and a torque priority threshold, a difference between a current accelerator position and an accelerator priority threshold, a current engine control governor value, a difference between the torque request and a sum of the current electrical torque and current combustion torque, and an operator responsiveness request. A further embodiment includes the power train protection module determining the power train protection torque change limit in response to a maximum acceleration threshold for a component of the power train, and/or a maximum torque slew rate for the component of the power train.

Another exemplary embodiment is a system including a hybrid power train having a combustion torque device and an electrical torque device, where the hybrid power train is at least a partially parallel configuration. The system includes a driveline mechanically coupled to the combustion torque device and the electrical torque device, a battery that exchanges energy with the driveline, and a torque input device that provides a torque request.

The system further includes a controller having modules for functionally executing operations for rate control in a hybrid power train. The controller includes a battery protection module that determines a battery protection charge rate limit, a power train protection module that determines a power train protection torque change limit, and a torque request module that determines the torque request. The controller further includes a rate control module that provides a torque balance parameter in response to the battery protection charge rate limit, the power train protection torque change limit, and the torque request. The torque balance parameter includes an electrical torque contribution target and a combustion engine torque contribution target. The controller further includes a torque control module that provides an electrical torque and a combustion torque to the driveline in response to the torque balance parameter.

An exemplary system further includes a component of the hybrid power train having a maximum acceleration threshold and/or a maximum torque slew rate threshold. The power train protection module further determines the power train protection torque change limit in response to the maximum acceleration threshold and/or the maximum torque slew rate threshold.

Another exemplary system further includes the controller having a priority determination module that determines a responsiveness priority value (RPV) in response to a priority parameter. The priority parameter includes a difference between the torque request and a torque priority threshold, a current engine control governor value, a difference between the torque request and a sum of the current electrical torque and current combustion torque, and an operator responsiveness request. The rate control module further determines the torque balance parameter in response to the RPV.

A further embodiment includes the battery protection module determining a battery state of charge. The battery protection module further determines the battery protection charge rate limit in response to the battery state of charge.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining a battery protection charge rate limit;
   determining a power train protection torque change limit;
   determining a torque request; and
   providing a torque balance parameter in response to the battery protection charge rate limit, the power train protection torque change limit and the torque request, the torque balance parameter comprising an electrical torque contribution target and a combustion engine torque contribution target; and
   providing an electrical torque and a combustion engine torque to a power train in response to the torque balance parameter.

2. The method of claim 1, further comprising determining a responsiveness priority value (RPV) and further providing the torque balance parameter further in response to the RPV.

3. The method of claim 2, wherein the providing the torque balance parameter further comprises determining at least one of the battery protection charge rate limit and the power train protection torque change limit in response to the RPV.

4. The method of claim 2, further comprising determining the RPV in response to a current torque request.

5. The method of claim 4, further comprising determining the RPV in response to a difference between the current torque request and a sum of a current electrical torque and a current combustion engine torque.

6. The method of claim 2, wherein the providing a torque balance parameter further comprises determining a maximum torque slew rate for a component of the power train in response to the RPV, and determining the power train protection torque change limit in response to the maximum torque slew rate for a component of the power train.

7. The method of claim 2, wherein the providing a torque balance parameter further comprises determining a maximum acceleration threshold for a component of the power train in response to the RPV, and determining the power train protection torque change limit in response to the maximum acceleration threshold for a component of the power train.

8. The method of claim 1, further comprising determining the power train protection torque change limit in response to a maximum torque slew rate for a component of the power train.

9. The method of claim 1, further comprising determining the power train protection torque change limit in response to a maximum acceleration threshold for a component of the power train.

10. An apparatus, comprising:
    a battery protection module structured to determine a battery protection charge rate limit;
    a power train protection module structured to determine a power train protection torque change limit;
    a torque request module structured to determine a torque request;
    a rate control module structured to provide a torque balance parameter in response to the battery protection charge rate limit, the power train protection torque change limit, and the torque request, the torque balance parameter comprising an electrical torque contribution target and a combustion engine torque contribution target; and
    a torque control module structured to provide an electrical torque and a combustion torque to a power train in response to the torque balance parameter.

11. The apparatus of claim 10, further comprising a priority determination module structured to determine a responsiveness priority value (RPV), and wherein the rate control module is further structured to determine the torque balance parameter in response to the RPV.

12. The apparatus of claim 11, wherein the battery protection module is further structured to determine the battery protection charge rate limit in response to the RPV.

13. The apparatus of claim 11, wherein the power train protection module is further structured to determine the power train protection limit in response to the RPV.

14. The apparatus of claim 11, wherein the battery protection module is further structured to determine a battery state of charge (SOC) and wherein the battery protection module is further structured to determine the battery protection charge rate limit in response to the SOC and the RPV.

15. The apparatus of claim 11, wherein the priority determination module is structured to determine the RPV in response to a priority parameter comprising at least one parameter selected from the parameters consisting of:
    a difference between the torque request and a torque priority threshold;
    a difference between a current accelerator position and an accelerator priority threshold;
    a current engine control governor value;
    a difference between the torque request and a sum of the current electrical torque and current combustion torque; and
    an operator responsiveness request.

16. The apparatus of claim 10, wherein the power train protection module is further structured to determine the power train protection torque change limit in response to at least one of:
    a maximum acceleration threshold for a component of the power train; and a maximum torque slew rate for the component of the power train.

17. A system, comprising:
a hybrid power train comprising a combustion torque device and an electrical torque device, wherein the hybrid power train is at least partially parallel, a driveline mechanically coupled to the combustion torque device and the electrical torque device, a battery structured to exchange energy with the driveline;
a torque input device structured to provide a torque request; and
a controller, comprising a battery protection module structured to determine a battery protection charge rate limit, a power train protection module structured to determine a power train protection torque change limit, a torque request module structured to determine the torque request, a rate control module structured to provide a torque balance parameter in response to the battery protection charge rate limit, the power train protection torque change limit, and the torque request, the torque balance parameter comprising an electrical torque contribution target and a combustion engine torque contribution target, and a torque control module structured to provide an electrical torque and a combustion torque to the driveline in response to the torque balance parameter.

18. The system of claim 17, further comprising a component of the hybrid power train having one of a maximum acceleration threshold and a maximum torque slew rate threshold, and wherein the power train protection module is further structured to determine the power train protection torque change limit in response to the one of the maximum acceleration threshold and the maximum torque slew rate threshold.

19. The system of claim 17, wherein the controller further comprises:
a priority determination module structured to determine a responsiveness priority value (RPV) in response to a priority parameter comprising at least one parameter selected from the parameters consisting of:
a difference between the torque request and a torque priority threshold;
a current engine control governor value;
a difference between the torque request and a sum of the current electrical torque and current combustion torque;
an operator responsiveness request; and
wherein the rate control module is further structured to determine the torque balance parameter in response to the RPV.

20. The system of claim 17, wherein the battery protection module is further structured to determine a battery state of charge, and wherein the battery protection module is further structured to determine the battery protection charge rate limit in response to the battery state of charge.

* * * * *